United States Patent [19]

Kapes, Jr.

[11] 4,074,318

[45] Feb. 14, 1978

[54] LED ARRAY IMAGING SYSTEM-SERIAL APPROACH

[75] Inventor: William John Kapes, Jr., Randolph Township, Morris County, N.J.

[73] Assignee: Bell Telephone Laboratories, Incorporated, Murray Hill, N.J.

[21] Appl. No.: 750,113

[22] Filed: Dec. 13, 1976

[51] Int. Cl.² .............................................. H04N 5/66
[52] U.S. Cl. .................................... 358/230; 358/240; 358/241
[58] Field of Search ........................ 358/230, 240, 241

[56] References Cited
U.S. PATENT DOCUMENTS 3,590,156  6/1971  Easton .................................. 358/241
3,733,435  5/1973  Chodil et al. .......................... 358/240
3,740,570  6/1973  Kaelin et al. .......................... 358/241

*Primary Examiner*—Richard Murray
*Attorney, Agent, or Firm*—Henry T. Brendzel

[57] ABSTRACT

Disclosed is a facsimile receiver employing an array of energy sources, which receiver is suitable for developing pictorial displays in real time. The energy sources within the array respond to incoming pictorial signals and to control signals which sequentially enable individual ones of the energy sources in the array as prescribed by appropriate control circuitry. Multitone operation is achieved by activating the individually enabled energy sources for controlled periods of time in accordance with the magnitude of the incoming signals.

9 Claims, 3 Drawing Figures

LED ARRAY IMAGING SYSTEM-SERIAL APPROACH

BACKGROUND OF THE INVENTION

1. Field of the Invention

This invention relates to facsimile receivers. More particularly, this invention relates to receiver imaging arrays having a plurality of energy sources and means for accessing and activating the energy sources.

2. Description of the Prior Art

In a conventional facsimile transceiver, transmission of data is performed by scanning a datacontaining document line by line and by converting the light reflected from the scanned portions of the document into a series of corresponding electrical signals defining successive picture elements (pels) in each line. Those signals are transmitted, typically over a conventional telephone line, to a remote facsimile transceiver where they are processed to reproduce the information on a suitable print medium.

In the receiver portion of a transceiver, several electronic and mechanical techniques are in common use for the purpose of processing received data to produce an image on a print medium. One such technique employs a mechanical stylus, operating in response to the received data signals, which prints the desired pattern on specially prepared paper. Another technique employs a print paper which contains overlaying black and white layers. Portions of the white layer are selectively burned or etched away by means of an electrically charged stylus that operates in accordance with the received data signals.

Still other known facsimile receivers employ a light source, such as a cathode ray tube. The light beam is modulated in accordance with the received data signals and is scanned over a suitably treated medium to form a pattern of locations on the paper. The medium may be photographic film which is subsequently processed to produce a permanent image. U.S. Pat. No. 3,924,061 issued to Tregay et al on Dec. 2, 1975, and U.S. Pat. No. 3,869,569 issued to Mason et al on Mar. 4, 1975, are examples of such facsimile receivers.

In yet other receivers, the light source employed is a laser beam. Such receivers operate in a manner similar to the manner of those receivers employing a cathode ray tube, but the beam is generally applied to a print medium other than photographic film. In "an experimental Page Facsimile System," by H. A. Watson, *Bell Laboratories Record*, March 1975, page 153, a laser receiver is described where the print medium is bismuth film.

A common thread to the above described techniques is the use of a single light source to form a two dimensional received image and the use of analog modulation of the light source intensity to control the gray levels of the resultant pattern.

In a slightly different field of art, a two-dimensional display is achieved by the use of a plurality of light sources arranged in a matrix configuration. Of common knowledge are gaseous displays and light emitting diode (LED) arrays which are used extensively to display alphanumerics. For example, LED arrays having groups of diodes preselectively interconnected and activated as a group are commonly used in calculator displays. A slightly different LED array arrangement is disclosed in U.S. Pat. No. 3,800,177 issued to Russ on May 26, 1974, where the LED array is arranged in a horizontal and vertical address matrix and where the activation of a particular horizontal and vertical address line pair activates a single LED. Whatever the application, LED arrays have heretofore been used only to display a two-tone image (generally red on a black background).

Different arrangements, such as described in U.S. Pat. No. 3,863,023 issued to Schmersal et al on Jan. 28, 1975, provide multitone displays. In the arrangement described by Schmersal, multitone operation (graduated intensity levels of a particular tone such as green, red, black, etc.) is achieved in a gaseous discharge panel having a multiple number of memory planes. In particular, a number of gray level ranges are defined and an equal number of memory planes are employed, with each memory plane having the same number of storage areas as the number of storage and discharge areas in the display panel. (For simplicity, the term "gray level" is employed in this disclosure regardless of the actual hue employed).

The Schmersal et al apparatus is cumbersome because it requires the use of hardware that is both bulky and expensive. Additionally, the memory planes of Schmersal must be accurately aligned, and separately driven with high voltages.

Another method for effecting different gray levels is described in U.S. Pat. No. 3,604,846 issued to Behane et al on Sept. 14, 1971. In accordance with the teachings of Behane et al, grey level graduations can be achieved by subdividing the area of each picture element (pel) into a plurality of subareas, e.g., a 3 × 3 matrix having nine subareas, and by marking black a preselected number of the subareas in accordance with the gray level desired. Thus, white pels are obtained by marking black none of the subareas, progressively darker gray pels are obtained by marking black greater numbers of subareas, and black pels are obtained by marking black all nine subareas.

This method is useful in situations where high receiver resolution is inherent in the system and is, therefore, obtained at low cost. Where high resolution is not inexpensively available, this method becomes too costly because for each microscopic resolution element (pel), a large plurality of microscopic resolution elements (the subareas) must be employed.

The alignment, resolution, and expense drawbacks of prior art multitone receivers have, to a large extent, been eliminated by a facsimile receiver system disclosed in my copending applications Ser. Nos. 750,273 and 750,275 filed on Dec. 13, 1976. In those systems, received signals are stored in a multiport memory, wherefrom they are simultaneously applied to a display array composed of energy sources, such as LEDs. Time duration controlled pulses are applied to activate the LEDs, causing them to light up in accordance with the data stored in the multiport memory.

The newly disclosed facsimile systems can operate at very high data rates because they simultaneously activate all of the energy sources. However, in applications where the received facsimile data rate is low, the complexity associated with simultaneous activation of the energy sources is not warranted. Since the pel data is received at a low rate, there is sufficient time between receptions to illuminate each received pel as it arrives.

SUMMARY OF THE INVENTION

Thus, one object of this invention is to provide a simple facsimile receiver system suitable for low data rate applications.

Another objective of this invention is to provide a facsimile system suitable for real-time utilization of received data in the display array.

Still another objective of this invention is to provide a facsimile receiver system having essentially no data storage memory.

These and other objectives of the invention are achieved with a serial access facsimile system employing an array of energy sources, which is arranged to respond in real time to received signals. To provide for the real time operation, the array energy sources are adapted to respond to incoming signals and to apparatus for sequentially enabling individual energy sources as prescribed by appropriate control circuitry. Multitone operation is achieved by activating the individually enabled energy sources for controlled periods of time arranged in accordance with the magnitude of the received data signals.

In another embodiment, a modifying element is interposed between the received signals and the array energy sources. The modifying element compensates for the energy output imperfections of the individual energy sources in the array by modifying the magnitude of the received signals destined to each of the energy sources.

It is fully contemplated that any desired type of energy sources may be employed in the practice of this invention. For purposes of this specification, however, only light emitting sources shall be considered, and, in particular, reference shall be made only to light emitting diodes.

DETAILED DESCRIPTION

Figure 1:
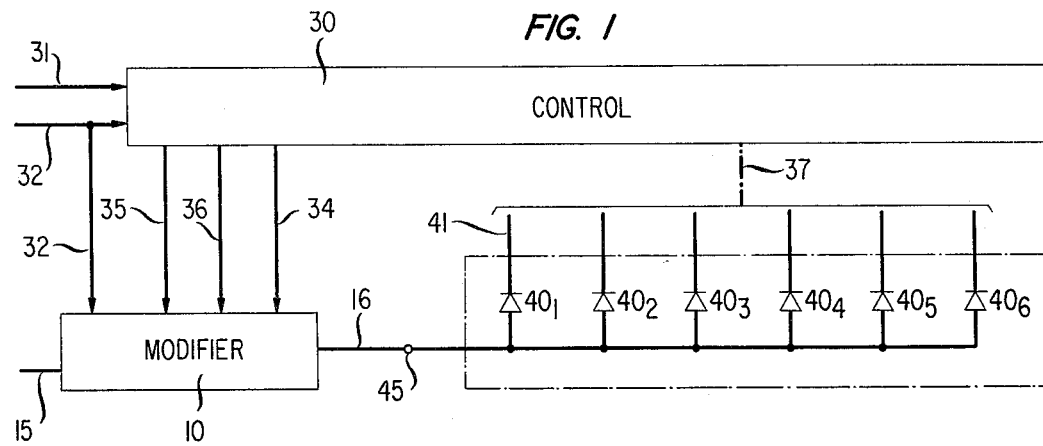
FIG. 1 depicts the schematic block diagram of a facsimile receiver embodying the principles of this invention.

The central element in the facsimile receiver of FIG. 1 is array 40 which comprises a plurality of LEDs, having their anodes connected to common terminal 45 and their cathodes connected to different ports of control element 30. The LEDs of array 40 are spatially arranged in a preselected format to give the desired pictorial display. Most commonly, the LEDs are arranged in rows and columns, forming a square matrix. Thus arranged, each LED represents a picture element in the received pictorial image. Also commonly, LEDs are arranged in a single row, and are adapted to sequentially display the received image one row at a time, while the print medium is passed across the row along an axis perpendicular to the row.

In addition to array 40, the facsimile system of FIG. 1 includes apparatus for accepting data signals and incoming control signals from a transmitting facsimile system. The data signals are applied to modifier element 10, and the incoming control signals are applied to control element 30. Out of modifier element 10, whose function is more thoroughly described hereinafter, modified data signals are applied to common terminal 45.

The incoming control signals comprise scan-start control signals, indicating the beginnings of scans, and new-data-sample control signals, indicating the appearance of new data samples. These incoming control signals are applied to control element 30 to develop appropriate control signals for modifier 10 and for the LEDs of array 40.

In accordance with the principles of this invention, whenever a scan-start control signal is received, element 30 enables the first LED in array 40 and disables all others. As depicted in FIG. 1, the first LED in array 40 (designated $40_1$) is enabled by applying a low potential to lead 41. LED $40_1$ is turned "on" by applying a potential voltage to terminal 45 greater than the voltage on lead 41, thereby permitting a current to flow through LED $40_1$. Whenever a new-data-sample control signal is received, the previously enabled LED is disabled by element 30 and its adjacent LED is enabled. In this manner, LEDs $40_1$, $40_2$, $40_3$, . . . $40_i$ are in turn enabled with each appearance of a new-data-sample control signal. The process repeats at the next reception of a scan-start control signal.

LED ILLUMINATION

From the foregoing it can be seen that while the LEDs of array 40 are enabled through control element 30, the data which determines the light output of each enabled LED is applied to array 40 via terminal 45. The function of modifier 10, then, is to vary the light output of enabled LEDs in accordance with received data signals.

The conventional method for varying the light output of LEDs is to vary the magnitude of the current flowing through the LEDs. This method, however, has three drawbacks. First, the current versus light-output characteristic of LEDs is not linear; second, the current versus light-output characteristics of different LEDs are substantially different; third, it is difficult to accurately control the magnitude of analog signals.

In attempting to circumvent those drawbacks, it has been discovered that superior control of LED light output can be had by controlling the time duration during which a LED is lit up, rather than by controlling the instantaneous light intensity of the LED.

The concept of duration control may be more fully appreciated when it is realized that the total light output of a lit LED is represented by the area under the curve of a plot depicting light intensity vs. time. With the aid of such a plot it may be observed that the total light output may be controlled with light duration as well as with light intensity. Although commonly the duration is kept constant while the light output is controlled by controlling intensity, in accordance with the principles of this invention, it is the invention that is kept constant while the light output is controlled by controlling duration. Accordingly, control element 30 and terminal 45 combine to both enable a particular LED and light the enabled LED with constant intensity, time duration controlled, light bursts.

The duration control can be analog or digital. In an analog duration control system, received data controls an astable multivibrator, causing the vibrator to develop a pulse having a width proportional to the magnitude of the data. That pulse is applied to terminal 45 causing the LED enabled by control element 30 to light up for the duration of the pulse. In a digital duration control system, received data causes the generation of fixed duration pulses, with the number of pulses being proportional to the magnitude of the received data. As in the analog approach, those pulses are applied to terminal 45 causing the LED enabled by control element 30 to light up. Digital control is generally more accurate than analog control and is therefore preferable in the implementation of the FIG. 1 system.

The actual implementation of a digital duration control system may follow any of a number of methods. In accordance with one of the simpler methods, received data signals are formatted into nonpositional number representations, and thus formatted, are directly applied to terminal 45. For example, when a received signal has a magnitude 7, the number 7 is converted to a sequence of digits having seven "1s" interposed within a field of "0s", e.g., 0000001111111, and that sequence is applied to terminal 45. Each pulse of logic level "1" causes the enabled LED to turn "on" for a fixed duration (one time unit) and thus the enabled LED is lit up for a total of seven time units.

To implement the above method, modifier 10 contains means for formatting received data signals into nonpositional number representations, and a register for storing the formatted representations. Control element 30 provides a clock signal to element 10 for storing the formatted signals in the register and for shifting the formatted signals onto terminal 45. The means for formatting received data signals is, of course, dependent on the format of the received signals, but in general comprises AND and OR gates interconnected in a conventional manner.

The formatting of received signals may be avoided entirely by developing element 10 control signals which are specifically adapted to the received signals' format. For example, most facsimile systems operate with binary coded representations. Binary coded representation means that pel information is contained in multibit binary coded words where each bit, $n$, has a weight of $2^{n-1}$. A "1" in the first position represents a magnitude of one, a "1" in the second position represents a magnitude of two, a "1" in the third position represents a magnitude of four, and so forth. By applying the first bit to terminal 45 for one time unit, the second bit to terminal 45 for two time units, the third bit to terminal 45 for four time units, etc., the total number of time units during which terminal 45 has a logic level "1" applied thereto is equal to the magnitude of the signal.

Generalizing from the above, for proper illumination of enabled LEDs, the number of time units during which each bit of the received signals is applied to terminal 45 must equal the weight of the applied bit.

EQUALIZATION

Generally, the diodes in LED array 40 are constructed from different slabs of material. It is expected, therefore, that the LEDs in array 40 do not all produce the same quanta of light in response to the same stimuli. Also, the various output ports of control element 30 do not necessarily provide exactly the same enabling stimulus when required to do so. Such irregularities produce undesired variations in the light output of array 40 but, when not extreme, the variations are not noticeable in a two-dimensional array where each LED corresponds to a particular pel in the pictorial field. In fact, variations in light output of up to 2:1 have been experienced, and such variations are noticed even in two dimensional arrays.

As indicated previously, in many facsimile receivers a linear (one row) array of LEDs is employed, with a number of LEDs in the row equal to the number of pels in one row of the transmitted image. In such applications, even very slight differences in LEDs' light outputs are noticeable. These differences manifest themselves as longitudinal striations across the pictorial field, commonly referred to as artifacts. Another consideration in the number of gray levels. Two-dimensional LED arrays produce satisfactory multitone pictorial fields even with a low number of bits in the data words. Inasmuch as changes in gray level are expected from pel to pel and from scan to scan, no artifacts show up. Operating two-dimensional arrays with only few bits to define the gray levels is, therefore, quite feasible. With a linear array, on the other hand, the accuracy of each level must be tightly controlled to prevent artifacts even if the number of gray levels is relatively small. Therefore, the number of bits employed to effectively define each gray level in a LED facsimile system having a linear array is larger than the number of bits required to distinguish a desired number of gray levels. For example, with 15 gray levels (characterizable by five bits), it has been found that the use of seven bit words to accurately define each of the gray levels is recommended.

The correction, or equalization, for the output light variations in the LEDs of array 40 is performed in element 10. Since the total light output of each LED is simply a sum of a number of light pulses having fixed quanta of light, it has been found that the light response of each LED is linear with respect to the magnitude of the stimulus and that the light output error is a multiplicative error. Forearmed with this finding, modifier element 10 is adapted to multiply the magnitude of each received signal by a multiplicative correction factor. The correction factor for each signal relates to the error characteristic of the LED in array 40 which displays the multiplied signal. If the light output of LED $40_1$, for example, is 0.75 of normal and the light output of LED $40_4$ is 1.22 of normal, then signal words destined to LED $40_1$ are divided by 0.75 (or multiplied in element 10 by 1.33) while the signal words destined to lead $40_4$ are divided by 1.22 (or multiplied in element 10 by 0.82).

Summarizing the functions of element 10, it receives data signals, equalizes the received signals in accordance with light output characteristics of the various LEDs in array 40, formats the equalized signals (in embodiments where reformatting is selected) and applies the formatted signals to terminal 45.

ELEMENT 10

Figure 2:
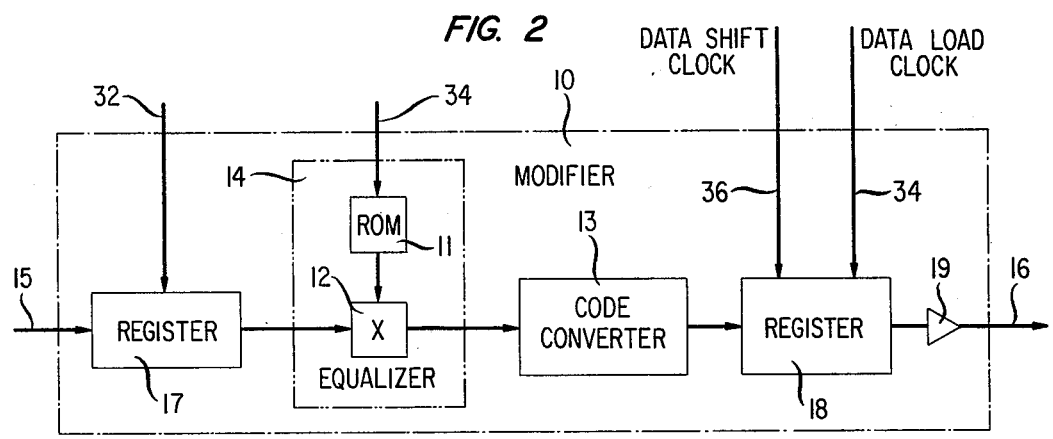
FIG. 2 illustrates one embodiment of modifier element 10 included in the system of FIG. 1.

As depicted in FIG. 2, element 10 comprises an input receiver 17, an equalizer 14, a code converter 13, and an output register 18. Register 17 stores incoming data signals by latching them into register 17 under control of line 32. Line 32 is the new-data-sample control signal which is simultaneously received in modifier 10 and in control element 30. The latched input signals are applied to equalizer 14. Equalizer 14 corrects for the light output variations of the LEDs in array 40 by multiplying each received signal by a correction factor that is characteristic of the particular LED to which the corrected signal is destined. When received signals are binary coded, the multiplicative correction can be made in a conventional multiplier. As depicted in FIG. 2, the output signals of register 17 are applied to one input terminal of multiplier 12, while the correction factors are applied to the other input terminal of multiplier 12. The correction factors are obtained from a read-only memory (ROM) 11, which stores the multiplicative correction factors required for each LED. Each address of ROM 11 contains the correction factor of one LED. To access the desired correction factor, bus 35 applies an appropriate address to ROM 11, which address is developed in control element 30.

Actually, multiplier 12 and ROM 11 may be combined in a single read-only memory to be accessed by an address bus comprising bus 35 juxtaposed with the parallel output leads of register 17. By employing such a single ROM, corrections of even nonlinear LED light output errors may easily be obtainable and any desired output format may be generated.

The output signals of equalizer 14 are the equalized input signals. In the equalizer embodiment depicted in FIG. 2, it is impliedly assumed that the intput signals on lead 15 are binary coded and that the output signals of equalizer 14 are also binary coded. With such an embodiment, when a nonpositional (or other) format is desired, a code converter 13 is connected to the output of equalizer 14. Code converter 13 is a conventional combinatorial circuit having parallel inputs and parallel outputs. Converter 13 may be implemented with a programmable logic array (PLA), an ROM, or AND and OR gates.

The output signals of converter 13 are applied to output register 18 which serves as a parallel to serial converter. Register 18 accepts equalized and reformatted data signals (when reformatting is employed) in parallel and delivers the equalized signals to terminal 45 serially. In applications where the output voltage levels of register 18 are incompatible with the operational voltage (or current) of the LEDs in array 40, amplifier 19 is interposed between the output of register 18 and the output of modifier element 10. To control register 18, lead 34 provides signals for loading register 18 and lead 36 provides signals for shifting register 18. Both leads 34 and 36 emanate from control element 30. As interconnected the output signal of register 18 is dependent on the input data to register 18 and on the pulse spacing of the data shift clock signal of lead 36.

With respect to the correction factors stored in ROM 11, it should be noted that the correction factors relate to the particular light output variations of the LEDs used in a specified array 40. The correction factors are obtained by actually constructing the array, by interfacing array 40 with control element 30 and modifier 10, and by testing the light response to each LED within the array. Once obtained, the multiplicative factors are permanently stored in ROM 11.

CONTROL ELEMENT 30

Figure 3:
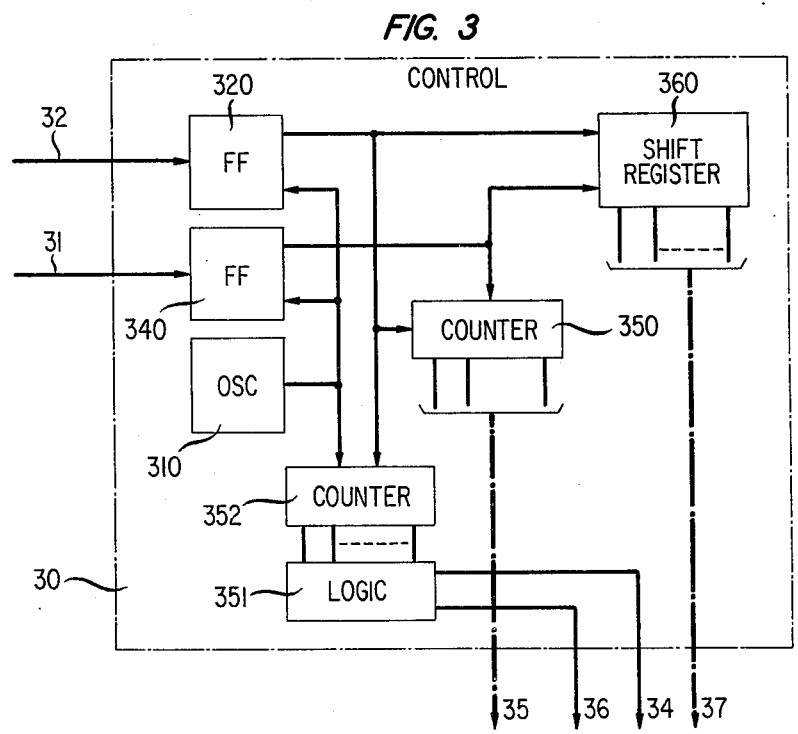
FIG. 3 depicts a control element 30 suitable for the system of FIG. 1.

FIG. 3 depicts a schematic diagram of control element 30 suitable for a facsimile system of FIG. 1 where input data is binary coded and modifier element 10 does not reformat the word representations (i.e., code converter 13 is not employed).

Element 30 receives scan-start control signals on lead 31 and new-data-sample control signals on lead 32. To synchronize the FIG. 1 system to a single clock, the signals on leads 31 and 32 are applied to flip-flops 320 and 340, respectively, where they are synchronized to oscillator 310. The output signal of flip-flop 320 is applied to counter 350 and to shift register 360. The output signal of flip-flop 340 is used to reset counter 350 and to present shift register 360.

Counter 350 is a binary counter whose parallel outputs comprise bus 35. Bus 35 is the address bus for ROM 11. When a scan-start control signal is received, counter 350 is reset. At each occurrence of a new-data-sample control signal, counter 350 is advanced by one.

The address represented by bus 35, which is employed to address ROM 11, may also be employed to generate the signals of bus 37 which enable the LEDs of array 40. The use of bus 35 to develop the signals of bus 37 requires a 1-out-of-N combinatorial selector. For large values of N such a selector may be prohibitively large. The same function is obtained in the FIG. 3 embodiment with register 360. When a scan-start control signal is received, the output signal of flip-flop 340 presets register 360 by causing the first output port 41 of the register 360 to be at logic level "0" and the remaining output ports of the register to be at logic level "1". With the occurrence of each new-data-sample control signal, the output signal of flip-flop 320 shifts the data within register 360, causing the logic level "0" to propagate through the register. Thus, by controlling both counter 350 and register 360 with flip-flops 320 and 340, the ROM 11 addresses track the enabled LEDs of array 40.

The two clock signals applied to output register 18 (leads 34 and 36) are developed by counter 352 and combinatorial logic block 351. Counter 352 is advanced with the output signal of oscillator 310 and is reset with the output signal of flip-flop 320. Logic block 351 is adapted to detect various states of counter 352, developing thereby the required control signals as described hereinafter.

Since counter 352 is advanced by oscillator 310 which has a period $T_o$ and is reset at every occurrence of a new-data-sample control signal, it can be seen that counter 352 subdivides the interval T between new-data-sample control signals into sub-intervals of period $T_o$.

In accordance with the principles of this invention, one LED in array 40 is illuminated at every occurrence of a new-data-sample control signal. To illuminate an LED, a data-load clock signal must be applied to register 18 via lead 34 and a data-shift clock signal must be applied to register 18 via lead 36. For binary coded words, the data-shift clock signal must provide pulses separated by time intervals that are a factor of two of one another, i.e., there must be one Time Unit between the first and second pulses of the clock signal, two Time Units between the second and third pulses of the clock signal, four Time Units between the third and fourth pulses of the clock signal, and so forth.

The duration of a Time Unit is clearly a function of the period T and of the number of bits per word stored in register 18 and applied to terminal 45. With binary coded words, for example, the maximum magnitude represented by $k$ bits per word is $2^k - 1$. This is the number of Time Units which must be included within interval T. Hence, a Time Unit corresponds to $[T/T_o(2^k - 1)]$ periods of oscillator 310, where the symbols [] denote the integer portion of the fraction includes within the symbols. For example, when T is approximately equal to 1 msec (the facsimile system operating at a rate of 1,000 pels per second), $k$ is 7 (127 levels of gray-other than white), and the frequency of oscillator 310 is 1 MHz ($T_o = 1$ μsec), a Time Unit corresponds to [1000/127] or 7 periods of oscillator 310, developing a maximum illumination of time 7×127 or 889 μsec. By detecting states 7, 14, 28, 56, 112, 224, 448, and 896 in counter 352, the control signals of leads 34 and 36 are obtained by applying the state 7 detection to lead 34 and by applying the combined detection of the other states (employing an OR gate) to lead 36.

Following the above example, the signals of leads 34 and 36 may be derived in logic block 351 for any combination of interval T, period $T_o$, and number of bits $k$.

What is claimed is:

1. A facsimile system responsive to an input signal comprising:
    a plurality of energy sources, each having a first type terminal and a second type terminal;
    first means, connected to said first type terminal of each of said energy sources, for individually enabling said energy sources;
    second means, responsive to said input signal, for simultaneously applying said input signal to each of said second type terminal of said energy sources; and
    third means for controlling the time duration during which said second means applies said input signal to each of said second type terminals of said energy sources to effect a gray level control.

2. The apparatus of claim 1 wherein said energy sources are light emitting sources.

3. The apparatus of claim 1 wherein said third means comprises a shift register responsive to duration controlled clock signals.

4. The facsimile system of claim 1 wherein:
    said second means simultaneously and contiguously applies said input signal to each of said second type terminals of said energy sources.

5. A facsimile system responsive to received signals comprising:
    an array of energy sources, each having a first type terminal and a second type terminal;
    first means, connected to said first type terminal of each of said energy source, for individually enabling said energy sources;
    second means, responsive to said received signals, for modifying said received signals in accordance with the energy output characteristics of said energy sources, developing thereby modified signals;
    third means, responsive to said second means, for applying said modified signals to each of said second type terminal of said energy sources; and
    fourth means for controlling the time duration during which said third means applies said modified signals to each of said second type terminal of said energy sources to effect a gray level control.

6. An imaging system responsive to an applied input signal comprising:
    a plurality of light-emitting devices arranged to form an array, each of said devices having a first terminal and a second terminal, with the first terminal of all of said devices connected to a common terminal;
    a shift register adapted for propagating a control pulse therethrough to enable selected ones of said devices and having a plurality of stages equal in number to said plurality of light-emitting devices, the output signal of each of said stages being applied to a corresponding one of said second terminals of each of said light emitting devices; and
    a light intensity control means, responsive to said input signal, for applying duration-controlled signals to said common terminal to control the light output of said light-emitting devices enabled by said shift register.

7. In a facsimile receiver responsive to sets of input signals and employing individually addressed energy sources, the improvement comprising:
    means for activating said energy sources once for each set of input signals and for controlling the activation duration of said energy sources to provide for multitone operation.

8. A facsimile system responsive to input signals composed of coded words comprising:
    an array of energy sources;
    means for sequentially enabling individual ones of said energy sources;
    means for generating control clock signal bursts, each burst comprising a plurality of pulses spaced at intervals related to the coding of said coded words; and
    means responsive to said means for generating control clock signal bursts for applying said coded words to said individually enabled energy sources.

9. The facsimile system of claim 8 wherein said input signals comprise binary coded words.

* * * * *